United States Patent
Lafon et al.

(10) Patent No.: US 7,212,890 B2
(45) Date of Patent: May 1, 2007

(54) AIRCRAFT DIALOG DEVICE FOR DIALOG WITH SYSTEM OF AIRCRAFT

(75) Inventors: Jean-Francois Lafon, Toulouse (FR); Nicolas Roux, Toulouse (FR); Christine Luneau, Colomiers (FR)

(73) Assignee: Airbus France S.A.S., Toulouse (FR)

( * ) Notice: Subject to any disclaimer, the term of this patent is extended or adjusted under 35 U.S.C. 154(b) by 37 days.

(21) Appl. No.: 10/715,405

(22) Filed: Nov. 19, 2003

(65) Prior Publication Data

US 2004/0158364 A1     Aug. 12, 2004

Related U.S. Application Data

(63) Continuation of application No. 10/061,281, filed on Feb. 4, 2002, now Pat. No. 6,668,215.

(30) Foreign Application Priority Data

Feb. 26, 2001  (FR) ................... 01 02567

(51) Int. Cl.
*G09G 5/08* (2006.01)
*G06F 17/30* (2006.01)

(52) U.S. Cl. ............................ 701/3; 345/856; 340/974

(58) Field of Classification Search ............... 701/3, 701/14, 36, 200; 345/856, 858, 157, 173, 345/156, 859; 340/974, 975, 995.27
See application file for complete search history.

(56) References Cited

U.S. PATENT DOCUMENTS

| | | | |
|---|---|---|---|
| 5,475,594 A * | 12/1995 | Oder et al. ............... 701/14 |
| 5,699,082 A * | 12/1997 | Marks et al. ............... 345/157 |
| 6,072,473 A * | 6/2000 | Muller et al. ............... 345/173 |
| 6,104,969 A * | 8/2000 | Beeks ............... 701/1 |
| 6,112,141 A * | 8/2000 | Briffe et al. ............... 701/14 |
| 6,172,747 B1 * | 1/2001 | Houlberg ............... 356/139.04 |
| 6,381,519 B1 * | 4/2002 | Snyder ............... 701/3 |
| 6,404,443 B1 * | 6/2002 | Westerman ............... 715/776 |
| 6,466,235 B1 * | 10/2002 | Smith et al. ............... 345/771 |
| 6,512,527 B1 * | 1/2003 | Barber et al. ............... 345/764 |
| 6,664,989 B1 * | 12/2003 | Snyder et al. ............... 345/856 |
| 2002/0120372 A1 | 8/2002 | Lafon et al. |

* cited by examiner

*Primary Examiner*—Dalena Tran
(74) *Attorney, Agent, or Firm*—Oblon, Spivak, McClelland, Maier & Neustadt, P.C.

(57) ABSTRACT

A dialog system for dialog between an operator of an aircraft and at least one system of the aircraft including a display configured to display at least one window including a plurality of responsive objects respectively associated with one of multiple functions of the at least one system of the aircraft. Also included is a first cursor control device including a continuous cursor moving mechanism configured to move a cursor in a continuous manner on the display so as to designate a responsive object and a second cursor control device including a discrete cursor moving mechanism configured to move the cursor in a discrete manner on the display responsive object by responsive object so as to designate a responsive object.

36 Claims, 3 Drawing Sheets

AIRCRAFT DIALOG DEVICE FOR DIALOG WITH SYSTEM OF AIRCRAFT

CROSS-REFERENCE TO RELATED APPLICATION

This application is a continuation application of U.S. application Ser. No. 10/061,281, filed Feb. 4, 2002 now U.S. Pat. No. 6,668,215, which claims priority under 35 U.S.C. § 119 to French Patent Application 01 02567, filed on Feb. 26, 2001, the entire disclosures of both which are incorporated herein by reference.

BACKGROUND OF THE INVENTION

1. Field of the Invention

This invention concerns a device for dialog between at least one operator of an aircraft and at least one system of the aircraft. This system includes the functions which are liable to be initiated by the dialog device, under the action of the operator, so that they can be executed.

In the context of this invention:

"execution of a function" means, in particular:

implementing a command to an element (engine, lighting, etc.) of the aircraft, or a particular action;

data entry;

access to pages of information on screens; and/or access to additional information or actions without changing a page;

the system, e.g. a flight management device, may include "procedures" for navigation, communication, monitoring and/or flight management of the aircraft, and "procedures" for managing elements such as engines or lighting, or alarms of the aircraft.

The dialog is implemented via at least one window which is displayed on at least one screen, in general a screen on the flight deck, and which is of an "interactive" type. In the context of this invention, "interactive window" means a window which includes responsive objects (points, ranges, alphanumeric values, etc.) which respond to the presence of a cursor. The cursor can be displaced by an appropriate means which can be actuated by an operator of the aircraft, in such a way that it can be displaced to a responsive object to designate it. When a responsive object is designated, i.e., when the cursor is displaced to it, it is highlighted, in particular by a change of appearance such as a change of color or increased brightness. The responsive object is then said to have a "focus." Execution of a function which is associated with a responsive object is initiated by confirmation (using an appropriate actuatable means) of the responsive object, which has previously been designated, i.e., a responsive object with a "focus." In the rest of the description, a responsive object will be said to be "designated" when it has such a "focus."

2. Discussion of the Background

Various dialog devices which are capable of implementing the designation and confirmation of a responsive object of this type are known.

In particular, from Patent FR-2 677 149, a device for reviewing the lateral flight plan of an aerodyne is known. This known device includes a designation device which is fitted with a confirmation element, and which is connected to the processor of the flight management system of the aerodyne in such a way as to obtain, on the screen of this system, as well as the geographical representation of the flight plan which the pilot initially selected:

a responsive field associated with each point of the screen;

dynamic function ranges which are used to compose menus; the function which is assigned to each of these ranges can vary from one menu to another and is indicated on the display corresponding to this range; and a luminous index, the displacements of which on the screen are controlled by the pilot acting on the designation device, in such a way that the index can be displaced to a range or a responsive field; the function which corresponds to this range is activated, or the point of the field is selected, by the pilot acting on the confirmation element.

The designation device includes a touch-responsive tablet, which includes a touch-responsive surface which is mounted on a fixed support structure via elastic devices, and a confirmation microswitch which is arranged in such a way as to detect the pushed-down position of the touch-responsive surface. Thus, a range or responsive field is designated by displacing a finger on the touch-responsive surface of this designation device, and confirmation is obtained by an increased pressure of this finger on the touch-responsive surface.

The reliability of this known dialog device is reduced, in particular as far as designation and confirmation of a responsive field or range are concerned, and in particular when the aerodyne is in an area of turbulence. In fact, in this case, because of possible shaking, it may be difficult to displace the finger exactly to the precise place which represents a range or field to be designated on the screen. Additionally, a slightly abrupt gesture by a pilot, in particular as a result of shaking, risks causing confirmation (pushed-down touch-responsive surface) of a range or field which he or she did not want to confirm.

Additionally, from Patent FR-2 743 921, a device, which is part of a global control system of an airplane, for aiding aerial navigation of the airplane, is known. This system includes, in particular, a Flight Management System (FMS) and interfaces for dialog with the pilot, including, among other things, information display screens for navigation and piloting, and a display and data entry console of Multipurpose Control Display Unit (MCDU) type. This MCDU console includes a keyboard which is exclusively intended for data entry, a screen and devices making it possible to select fields which are displayed on the screen and to activate the selected field to initiate operations which are related to what is displayed. These selection and activation devices make it possible to:

displace a cursor in a menu which is displayed on the screen, to select a field which this menu offers; for instance, the brightness of this field increases when the cursor is displaced to this field; and activate a selected field.

As a device for selection (i.e., designation), this known document foresees displacement keys or the use of a touch-responsive screen or a touch-responsive tablet beside the screen.

Use of a touch-responsive screen or tablet again raises the problem of reliability of designation.

Additionally, for each of the devices which are disclosed by the abovementioned Patents FR-2 677 149 and FR-2 743 921, failure of the designation or confirmation device prevents the corresponding device from functioning.

Additionally, Document U.S. Pat. No. 6,112,141 describes an airplane flight deck which contains, in particular, multiple screens, a multi-functional control unit, two keyboards (or voice-operated systems) which are exclusively intended for data entry, and a dialog interface. This dialog interface includes at least two identical cursor control devices, in the form of control balls or spheres, one of which is intended for the pilot and the other for the copilot. These control balls make it possible to displace the corresponding cursors continuously on the screens, to designate responsive fields.

There is also a problem of the reliability of designation of responsive objects, in particular when the airplane is shaking, because of this continuous control of the cursors.

Additionally, when one of the cursor control devices fails, e.g., that of the pilot (although in this case the functions can be controlled if necessary by the other cursor control device, that of the copilot in this case), the pilot has no control over the corresponding controls, which is of course very inconvenient.

SUMMARY OF THE INVENTION

The purpose of this invention is to overcome the abovementioned drawbacks. It concerns a dialog device of the abovementioned type which, among other advantages, is particularly reliable whatever the flight conditions, and in particular during turbulence, and which makes it possible to continue to carry out the pilot/system dialog, even in the case of failure of some of its elements.

For this purpose, according to the invention, the device for dialog between at least one operator of an aircraft and at least one system of the aircraft, the dialog device including:

at least two interactive windows which can be displayed on at least one screen, and each of which includes at least one responsive object which is associated with one of multiple functions, the functions being capable of being initiated by the dialog device under the action of the operator so that they are executed;

at least one cursor control device, which is capable of being controlled by the operator, and which includes:

at least one actuatable displacement means, which is capable of displacing a cursor on the interactive windows, to designate a responsive object; and at least one actuatable confirmation means, which is capable of confirming a responsive object which is designated by the cursor, to initiate execution of the function which is associated with the responsive object; and at least one keyboard, including keys which enable the operator to enter alphanumeric data into the system, is notable in that the means for displacing the cursor control device causes a continuous displacement of the cursor on the windows, under the action of the operator, and in that the keyboard includes, additionally:

at least one cursor displacement key, making it possible to cause a discrete displacement of the cursor, responsive object by responsive object, on a specified window;

at least one auxiliary displacement key, making it possible to displace the cursor from window to window; and at least one confirmation key, making it possible to confirm a responsive object which is designated by the cursor, to initiate execution of the function which is associated with the responsive object.

Thus, since, thanks to the invention, the operator has available two control means (cursor control device and keyboard), in the case of failure of one of these control means, he or she can still use the other control means to initiate execution of functions, which obviously increases the reliability of the dialog device.

Additionally, since the keyboard makes it possible to implement a discrete displacement of the cursor, i.e., at each actuation of the cursor displacement key the cursor designates a different responsive object, so that all existing responsive objects can be designated (this designation of all responsive objects being preferably carried out cyclically), it is possible to designate exactly the responsive object which one wishes to highlight, even in the case of turbulence, since no precise, continuous actuation or displacement is necessary.

Additionally, since the cursor control device and keyboard are complementary control means, but very different from each other, the operator can choose whichever is more convenient, either throughout the flight, or temporarily depending on phases and/or conditions of flight, which provides great flexibility of use and increases the comfort of the operator in the execution of his or her tasks.

Additionally, since the keyboard already exists on the aircraft, for entering data into the system, the dialog device according to the invention does not increase the space requirement.

Advantageously, the dialog device includes multiple screens, of which at least some include at least one interactive window, and the keyboard includes function keys which are associated with certain of the system functions and make it possible, when they are operated, to displace the cursor directly onto the responsive object which is associated with the function key which is operated, irrespective of the screen on which the responsive object is displayed. This enables the operator to access certain functions directly by a single action (pushing down the corresponding function key), without having to know the prior position of the cursor. These characteristics are obviously particularly advantageous in critical or emergency situations, and are reserved for particular functions, e.g. functions which must be implemented when an important element of the aircraft fails.

Additionally and advantageously, the dialog device according to the invention includes multiple screens, of which at least some include at least one interactive window, and the cursor control device and the keyboard each include one actuatable means (e.g., a function key for the keyboard) for displacing, screen by screen, the cursor from one screen to another.

Additionally and advantageously, each interactive window is divided into multiple fields, each of which includes at least one responsive element, which in particular makes it possible to use an auxiliary cursor displacement key of the keyboard, causing a discrete displacement of the cursor from field to field.

Additionally and advantageously:

each screen includes one default field, which is situated on one of the interactive windows of the screen, and on which the cursor arrives after a change of screen under the control of the keyboard; and/or each interactive window includes one default field, on which the cursor arrives after a change of window under the control of the keyboard; and/or each default field includes one default-responsive object, on which the cursor arrives after a change of field.

Additionally, the cursor control device includes a means for incrementing the alphanumeric values in at least one value input field of at least one of the interactive windows. Thus, in the case of non-availability or failure of the keyboard, the operator is still able to enter data into the system. To do this, the pilot can, in particular, display an alphanumeric box on a window using a key of the cursor control device, to enter data by designation with the cursor.

Preferably, the dialog device according to the invention includes two cursor control devices and two keyboards, one cursor control device and one keyboard being intended for the pilot of the aircraft, and the other cursor control device and the other keyboard being intended for the copilot of the aircraft.

Additionally, in a particular embodiment, the dialog device includes eight screens, of which three are intended for the pilot of the aircraft, three others are intended for the copilot of the aircraft, and two are common to the pilot and copilot.

This invention also concerns an aircraft system as above, which is notable in that it includes the dialog device according to the invention, to allow a dialog with an operator, in particular a pilot, of the aircraft.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
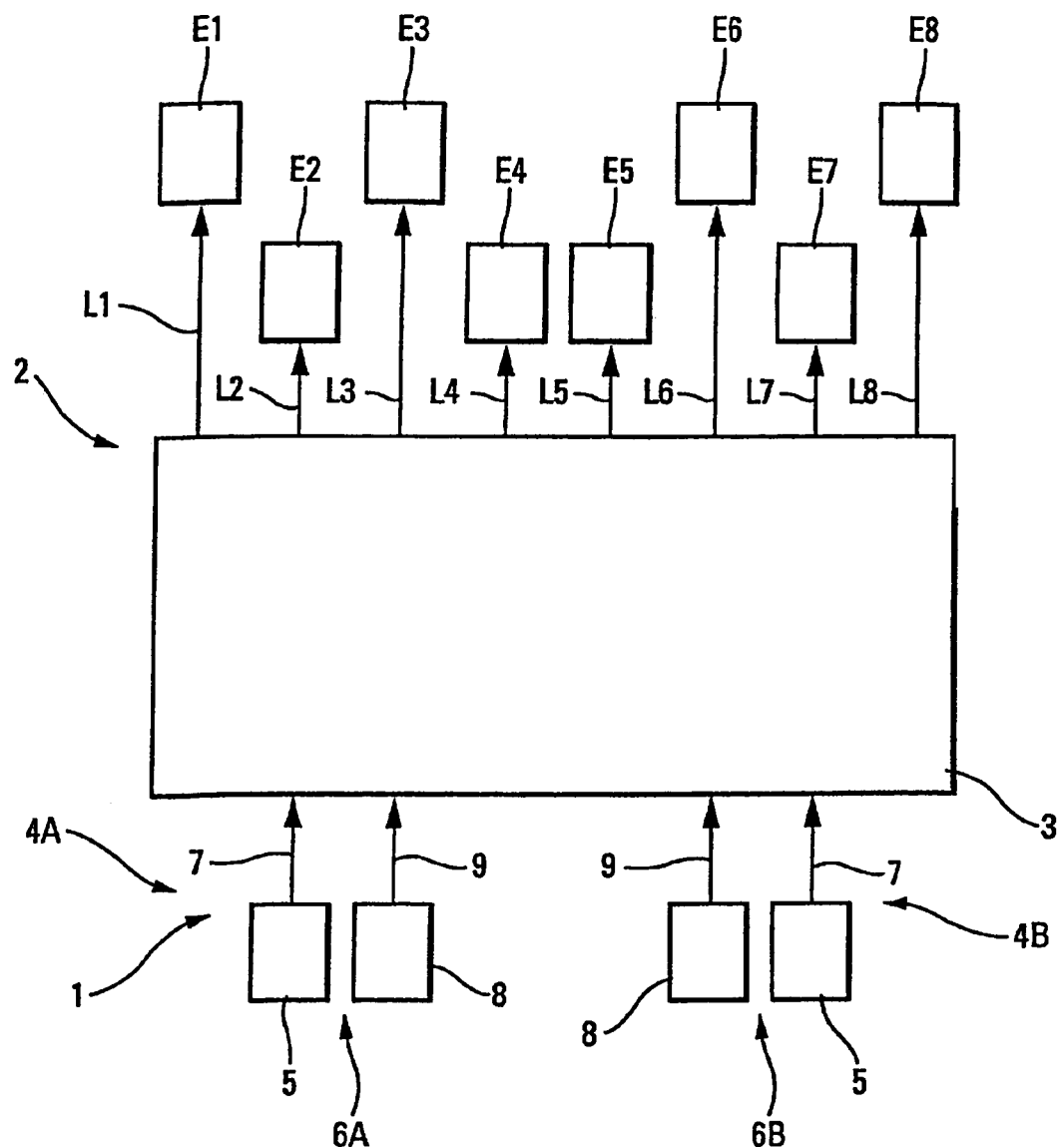
FIG. 1 is the block diagram of a dialog device according to the invention which is associated with a system of an aircraft.

Referring now to the drawings, wherein like reference numerals designate identical or corresponding parts throughout the several views, the present invention will be described.

The dialog device 1 according to the invention and represented schematically in FIG. 1 is placed on board an aircraft (not shown), particularly a civil transport airplane, and is preferably arranged on the flight deck of the aircraft. This dialog device 1 is intended to allow dialog between at least one operator of the aircraft, in particular a pilot, and a known system, e.g., a flight management system.

The dialog device 1 is associated with an assembly 2 which includes a computer 3 and multiple screens E1 to E8 which are linked, via links L1 to L8 respectively, to the computer 3.

Figure 2:
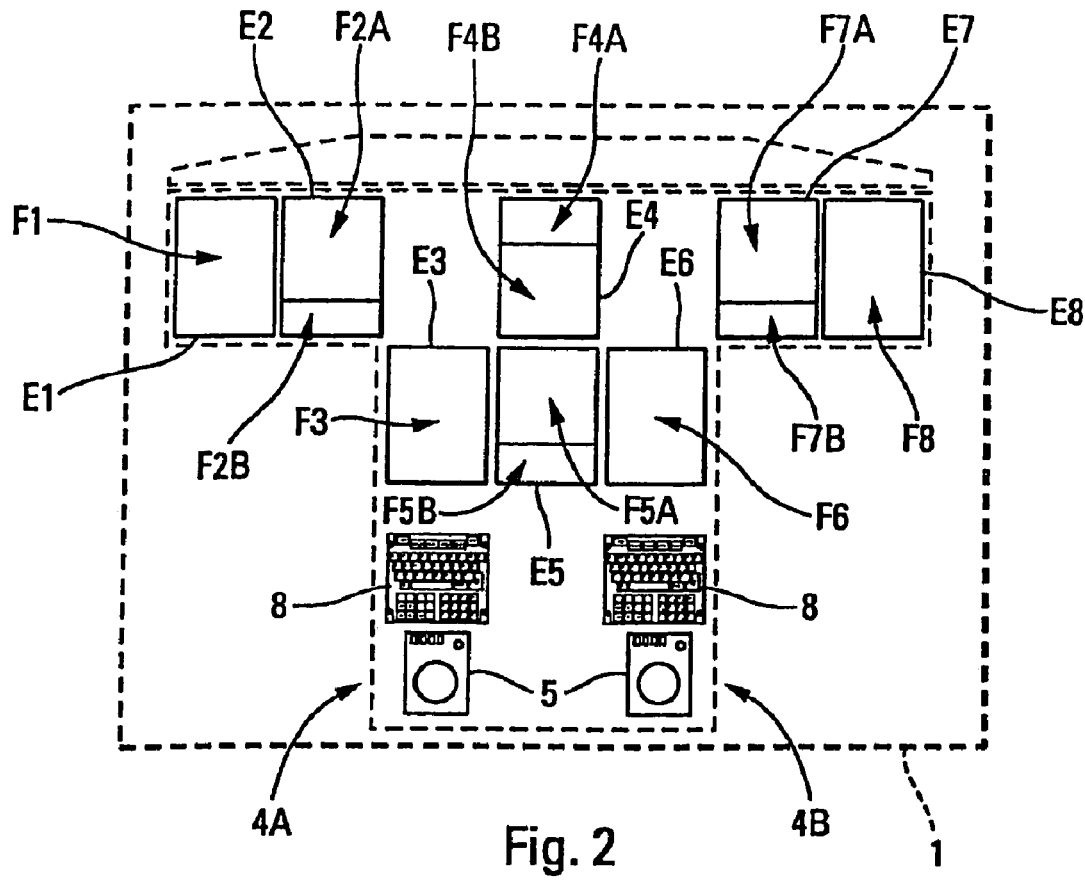
FIG. 2 shows schematically a preferred embodiment of a dialog device according to the invention.

In the preferred (but not exclusive) embodiment, which is represented in FIGS. 1 and 2, and as shown more precisely in FIG. 2, the assembly 2 is divided into two, one part of the system being intended for the pilot, e.g., the left part 4A, and the other part (the right part 4B) being intended for the copilot. With such a distribution, preferably, screens E1 to E3 are intended for the pilot, screens E6 to E8 for the copilot, and screens E4 and E5 are common to both.

The screens E1, E3, E6 and E8 each include one display window, respectively F1, F3, F6 and F8, whereas the screens E2, E4, E5 and E7 each include two display windows, respectively F2A and F2B, F4A and F4B, F5A and F5B, and F7A and F7B. It is obviously conceivable that some screens include more than two windows.

As an illustration, it is possible to display:

on windows F1 and F8, the usual information of a screen of "Primary Flight" type, such as an artificial horizon which inclines when the airplane inclines;

on windows F2A and F7A, navigation information;

on windows F2B and F7B, monitoring information;

on windows F3 and F6, information relative to a display device MFD ("Multi Function Display");

on window F4A, information about the engines;

on window F4B, information about procedures;

on window F5A, information about the aircraft systems; and on window F5B, additional information.

Screens E1 to E8 are of the known Liquid Crystal Display (LCD) type.

Additionally, each of the windows F1 to F8 is a so-called "interactive window," i.e., a window which includes objects (ranges, alphanumeric values, etc.) which are responsive to the presence of a cursor CU, each of the responsive objects OS being associated with a particular function which can be executed. The cursor CU can be displaced by a cursor control device 5.

The dialog device 1 includes two identical cursor control devices 5, one of which is part of a set of controls 6A of the pilot and the other is part of a set of controls 6B of the copilot. The cursor control devices 5 are linked via links 7 to the computer 3.

Operating one of the devices 5 makes it possible to displace the cursor CU in such a way as to take it onto a responsive object OS to designate it. When a responsive object OS is designated, it is highlighted, in particular by a change of appearance such as a change of color or increased brightness. Execution of a function which is associated with a responsive object OS is initiated by confirmation (using a device 5) of the responsive object OS, which has been designated previously.

Figures 3, 4:
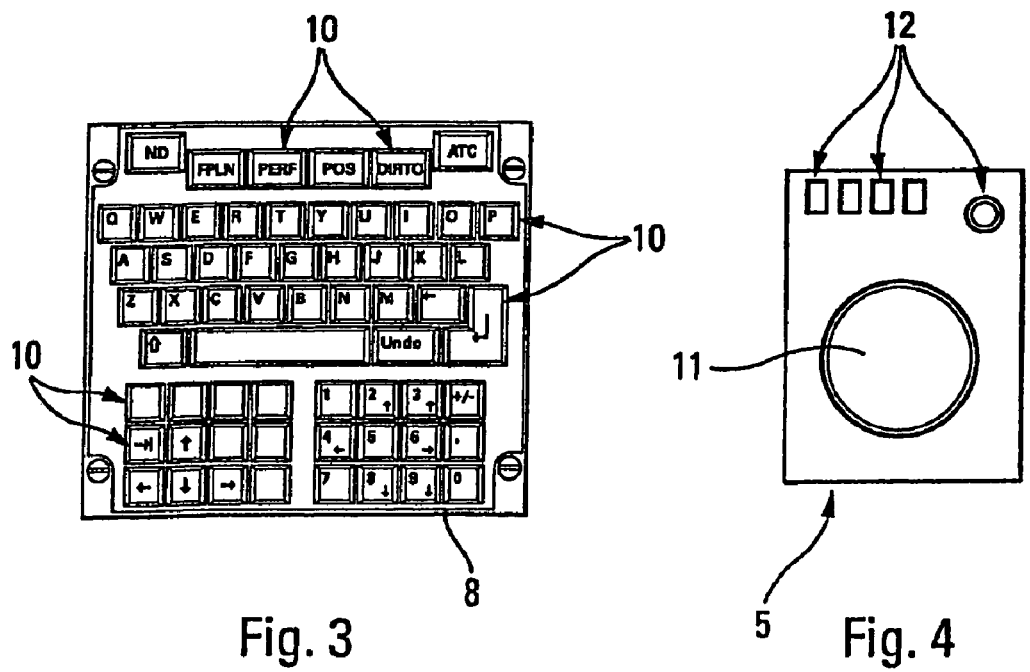
FIGS. 3 and 4 show in more detail, respectively, two cursor control devices which are part of the dialog device of FIG. 2.

Each of the sets of controls 6A includes, additionally, a keyboard 8 which is linked by a link 9 to the computer 3, and which includes keys 10, as shown in FIG. 3, which in the usual way allow the operator to enter alphanumeric data into the computer 3.

According to the invention, each of the cursor control devices 5 includes, as shown schematically in FIG. 4:

an actuatable displacement means 11, preferably in the form of a control ball or spherical mouse, which is capable of displacing the cursor CU continuously on the windows F1 to F8 to designate a responsive object OS; and an actuatable confirmation means, e.g. a key 12, which is capable of confirming a responsive object OS which is designated by the cursor CU, to initiate execution of the function which is associated with the responsive object OS.

Each of the cursor control devices 5 may include other keys, buttons or control elements which are intended for additional functions. All these keys, buttons and control elements are designated by the general reference 12 on FIG. 4.

In particular, each device 5 may include:

a key 12 for calling up an alphanumeric value;

a control element 12 for incrementing alphanumeric values in at least one value input field of at least one of the interactive windows F1 to F8. Thus, in the case of non-availability or failure of his or her keyboard 8, an operator (the pilot or copilot) is still able to enter data into the computer 3; and a control element 12, e.g., a thumbwheel, making it possible to displace the cursor CU in a menu and to scroll a particular list.

Additionally, according to the invention, the keyboard 8 includes among the keys 10:

at least one cursor displacement key, e.g. the "←", "↓", "↑", and "→" keys, making it possible to cause a discrete displacement of the cursor CU, responsive object OS by responsive object OS, on a specified window;

at least one auxiliary displacement key, making it possible to displace the cursor CU from window to window; and at least one confirmation key, making it possible to confirm a responsive object OS which is designated by the cursor CU, to initiate execution of the function which is associated with the responsive object OS.

Thus, thanks to the invention, each of the operators (pilot, copilot) has available two control means (cursor control device 5 and keyboard 8), so that in the case of a failure of one of his or her control means 5, 8, he or she can still use the other control means to initiate execution of functions, which of course increases the reliability of the dialog device 1.

Additionally, since the keyboard 8 makes it possible to implement a discrete displacement of the cursor CU, i.e., at each actuation of the cursor displacement key the cursor CU designates a different responsive object OS, so that all existing responsive objects OS can be designated (this designation of all responsive objects being preferably carried out cyclically), it is possible to designate exactly the responsive object OS which one wishes to highlight, even in the case of turbulence, since no precise, continuous actuation or displacement is necessary.

Additionally, since the cursor control device 5 and keyboard 8 are complementary control means, but very different from each other, each operator (pilot, copilot) can choose whichever is more convenient, either throughout the flight, or temporarily depending on phases and/or conditions of flight, which provides great flexibility of use and increases the comfort of the pilot and copilot in the execution of their tasks.

Additionally, since the keyboard 8 already exists on the aircraft, for entering data into the computer 3, the dialog device 1 according to the invention does not increase the space requirement.

Additionally, the keyboard 8 includes function keys, e.g., the "FPLN", "PERF", "DIRTO", "ATC" ("Air Traffic Control") keys, which are associated with certain of the functions and make it possible, when they are operated, to displace the cursor CU directly onto the responsive object OS which is associated with the function key which is operated, irrespective of the screen E1 to E8 on which the responsive object OS is displayed. This enables the operator to access certain functions directly by a single action (pushing down the corresponding function key), without having to know the prior position of the cursor CU. These characteristics are obviously particularly advantageous in critical or emergency situations, and are reserved for particular functions, e.g. functions which are implemented when an important element (engine, etc.) of the aircraft fails.

Additionally, on each set of controls 6A and 6B, the cursor control device 5 and the keyboard 8 each include an actuatable means, preferably a function key, for displacing, screen by screen, the cursor CU from one screen to another. Preferably, this change of screen is cyclic. Thus, as an example:

for part 4A, switching can be implemented in the following sequence: E1, E2, E3, E4, E5, E1, E2, etc.; and for part 4B, switching can be implemented in the following sequence: E4, E5, E6, E7, E8, E4, E5, etc.

Figure 5:
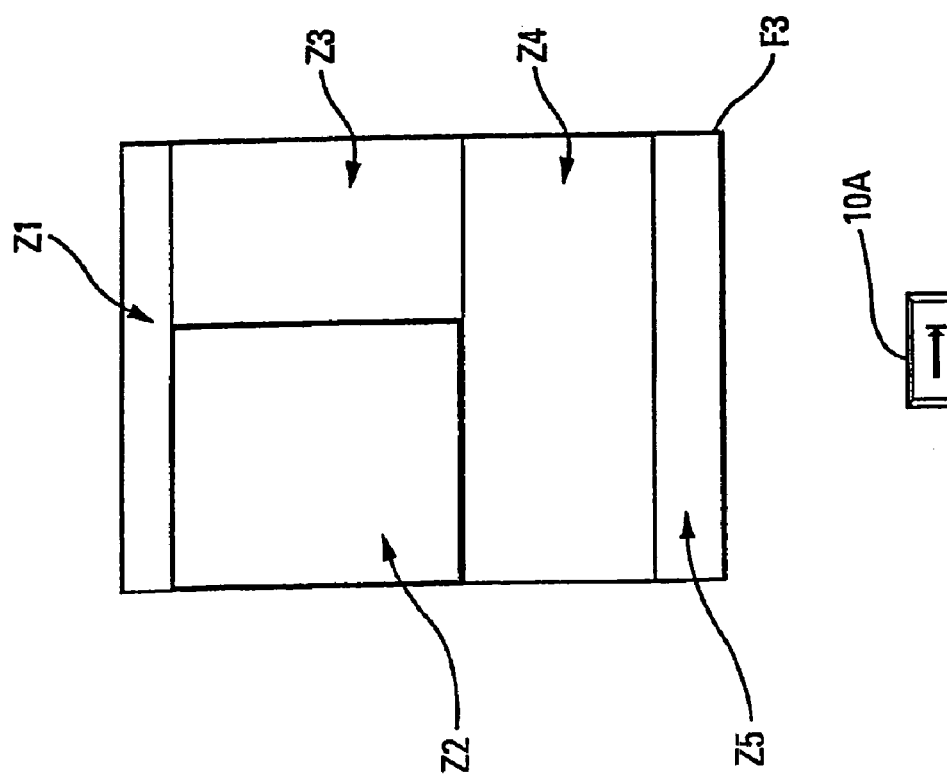
FIG. 5 shows schematically an interactive window divided into fields.

According to the invention, each interactive window, as shown for instance for interactive window F3 in FIG. 5, is divided into multiple fields Z1 to Z5, each of which includes at least one responsive element OS, and the keyboard 8 includes an auxiliary cursor displacement key (e.g., tabulation key 10A), for causing a discrete displacement of the cursor CU from field to field.

Figure 6:
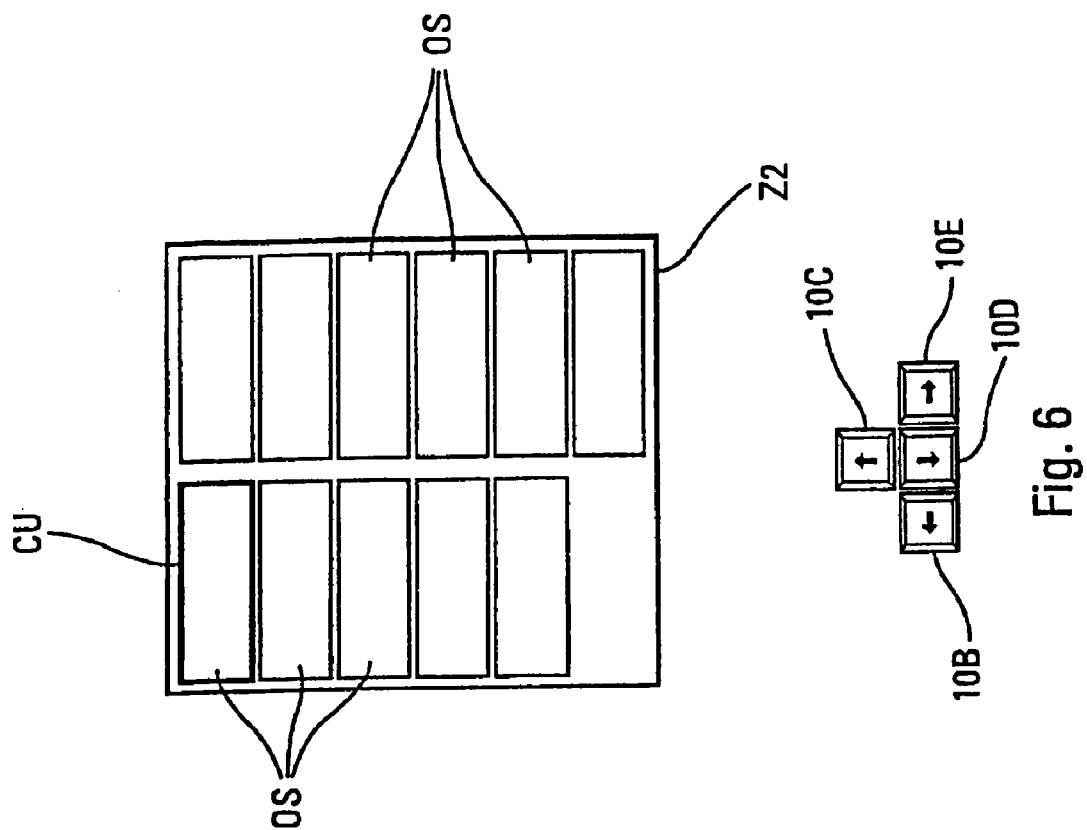
FIG. 6 shows schematically a field of an interactive window with responsive objects.

Additionally, according to the invention:

Each screen E1 to E8 includes one default field, which is situated on one of the interactive windows of the screen, and on which the cursor CU arrives after a change of screen under the control of the keyboard 8;

Each interactive window F1 to F8 includes one default field, on which the cursor arrives after a change of window under the control of the keyboard 8, e.g., field Z2 for window F3 shown in FIG. 5. The keyboard 8 preferably carries out directly only changes of field (field to field), changes of window being obtained indirectly by passing from the last field of a window, e.g., window F5A, to the first field of a following window, e.g., window F5B. Of course, when a screen, e.g., screen E3, includes only one window F3, the default field of the screen E3 corresponds to the default field of this unique window F3; and Each default field includes one default-responsive object OS, on which the cursor CU arrives after a change of field, as shown in FIG. 6 for field Z2 of FIG. 5. As indicated above, when the cursor CU arrives on a responsive object OS, this object is designated or "marked." On FIG. 6, this marking, e.g. increased brightness, is shown by a thicker outline of the designated responsive object OS. As for the cursor CU, its presence is simply indicated by a reference line to the responsive object OS.

Additionally, in each field Z1 to Z5, the responsive objects OS are arranged in a suitable way for the keys of the keyboard 8, which are intended for discrete displacement of the cursor CU from one responsive object OS to another.

In the example of FIG. 6, the responsive objects OS are arranged in columns and rows, so that, of the keys 10 of the keyboard 8, the direction arrow keys 10B to 10B "←", "↑", "↓", and "→" are sufficient to control the displacement of the cursor CU.

If the responsive objects OS are arranged according to a single direction (row or column), two keys are enough, i.e. keys "←" and "→" in the case of arrangement in a row and "↑" and "↓" in the case of arrangement in a column, making it easier to control displacement of the cursor CU.

What is claimed is:

1. A dialog system for dialog between an operator of an aircraft and at least one system of the aircraft, comprising:

a display configured to display at least one window including a plurality of responsive objects respectively associated with only one of multiple functions of the at least one system of the aircraft;

a first cursor control device including a continuous cursor moving mechanism configured to move a cursor in a continuous manner on the display so as to designate a responsive object; and a second cursor control device configured to be activated during an emergency mode of the aircraft and including a discrete cursor moving mechanism configured to move the cursor in a discrete and cyclical manner on the display, responsive object by responsive object, so as to designate a responsive object, wherein the at least one window includes a plurality of windows, wherein the second cursor control device further includes an auxiliary moving mechanism configured to move the cursor discretely from one window to another window in the plurality of windows,
wherein each window is divided into a plurality of fields each including at least one responsive object, and
wherein said each window includes one default field on which the cursor arrives after moving from said one window to said another window.

2. The dialog system according to claim 1,
wherein the continuous cursor moving mechanism is a control ball on a mouse, and
wherein the discrete cursor moving mechanism is an arrow key on a keyboard.

3. The dialog system according to claim 1,
wherein the first cursor control device further includes a first activation mechanism configured to activate a function associated with the responsive object designated by the continuous cursor moving mechanism, and
wherein the second cursor control device further includes a second activation mechanism configured to activate a function associated with the responsive object designated by the discrete cursor moving mechanism.

4. The dialog system according to claim 3,
wherein the first activation mechanism is a key on a mouse, and
wherein the second activation mechanism is an Enter key on a keyboard.

5. The dialog system according to claim 4, further comprising a confirming device configured to confirm the designated responsive object either in an actuatable manner or using at least one confirmation key.

6. The dialog system according to claim 1,
wherein each default field includes one default responsive object.

7. The dialog system according to claim 1,
wherein the auxiliary moving mechanism is a Tab key on a keyboard.

8. The dialog system according to claim 1,
wherein the second cursor control device further includes a function operation mechanism configured to automatically move the cursor to a responsive object associated with the function operation mechanism.

9. The dialog system according to claim 8,
wherein the function operation mechanism is a function key on a keyboard.

10. The dialog system according to claim 1,
wherein the first cursor control device is a mouse and the second cursor control device is a keyboard.

11. The dialog system according to claim 1,
wherein the display includes a plurality of displays, and
wherein the first and second cursor control devices respectively include first and second display changing mechanisms configured to move the cursor from one display to another display in the plurality of displays.

12. The dialog system according to claim 11,
wherein the first display changing mechanism is a key on a mouse, and
wherein the second display changing mechanism is a key on a keyboard.

13. The dialog system according to claim 1,
wherein the display includes eight displays, of which three displays are for a pilot of the aircraft, three other displays are for the copilot of the aircraft, and two displays are for common use by the pilot and copilot of the aircraft.

14. A dialog system for dialog between an operator of an aircraft and at least one system of the aircraft, comprising:

a display configured to display at least one window including a plurality of responsive objects respectively associated with only one of multiple functions of the at least one system of the aircraft;
a first cursor control device including a continuous cursor moving mechanism configured to move a cursor in a continuous manner on the display so as to designate a responsive object; and
a second cursor control device configured to be activated during an emergency mode of the aircraft and including a discrete cursor moving mechanism configured to move the cursor in a discrete and cyclical manner on the display, responsive object by responsive object, so as to designate a responsive object,
wherein the display includes a plurality of displays,
wherein the first and second cursor control devices respectively include first and second display changing mechanisms configured to move the cursor from one display to another display in the plurality of displays,
wherein the at least one window includes a plurality of windows, each window being divided into a plurality of fields including at least one responsive object, and
wherein each display includes one default field situated on one of the plurality of windows, and on which the cursor arrives after moving from said one display to said another display.

15. A dialog system for dialog between an operator of an aircraft and at least one system of the aircraft, comprising:
means for displaying at least one window including a plurality of responsive objects respectively associated with only one of multiple functions of the at least one system of the aircraft;
first means for moving a cursor in a continuous manner on the means for displaying so as to designate a responsive object; and
second means for moving the cursor in a discrete and cyclical manner on the means for displaying, responsive object by responsive object, so as to designate a responsive object,
wherein the second means for moving is configured to be activated during an emergency mode of the aircraft,
wherein the at least one window includes a plurality of windows,
wherein the second means for moving includes auxiliary means for moving the cursor discretely from one window to another window in the plurality of windows,
wherein each window is divided into a plurality of fields each including at least one responsive object, and
wherein said each window includes one default field on which the cursor arrives after moving from said one window to said another window.

16. The dialog system according to claim 15,
wherein the first means for moving is a control ball on a mouse, and
wherein the second means for moving is an arrow key on a keyboard.

17. The dialog system according to claim 15,
wherein the first means for moving includes a first means for activating a function associated with the responsive object designated by the first means for moving, and
wherein the second means for moving includes a second means for activating a function associated with the responsive object designated by the second means for moving.

18. The dialog system according to claim 17,
wherein the first means for activating is a key on a mouse, and wherein the second means for activating is an Enter key on a keyboard.

19. The dialog system according to claim 18, further comprising a means for confirming the designated responsive object either in an actuatable manner or using at least one confirmation key.

20. The dialog system according to claim 15, wherein each default field includes one default responsive object.

21. The dialog system according to claim 15, wherein the auxiliary means for moving is a Tab key on a keyboard.

22. The dialog system according to claim 15, wherein the second means for moving includes an automatic means for automatically moving the cursor to a responsive object associated with the automatic means for moving.

23. The dialog system according to claim 22, wherein the automatic means for moving is a function key on a keyboard.

24. The dialog system according to claim 15, wherein the first means for moving is a mouse and the second means for moving is a keyboard.

25. The dialog system according to claim 15, wherein the means for displaying includes a plurality of display means, and
wherein the first and second means for moving respectively include first and second changing means for moving the cursor from one display means to another display means in the plurality of displays means.

26. The dialog system according to claim 25, wherein the first changing means is a key on a mouse, and wherein the second changing means is a key on a keyboard.

27. The dialog system according to claim 15, wherein the means for displaying includes eight displays, of which three displays are for a pilot of the aircraft, three other displays are for the copilot of the aircraft, and two displays are for common use by the pilot and copilot of the aircraft.

28. A dialog system for dialog between an operator of an aircraft and at least one system of the aircraft, comprising:
means for displaying at least one window including a plurality of responsive objects respectively associated with only one of multiple functions of the at least one system of the aircraft;
first means for moving a cursor in a continuous manner on the means for displaying so as to designate a responsive object; and
second means for moving the cursor in a discrete and cyclical manner on the means for displaying, responsive object by responsive object, so as to designate a responsive object,
wherein the second means for moving is configured to be activated during an emergency mode of the aircraft,
wherein the means for displaying includes a plurality of display means,
wherein the first and second means for moving respectively include first and second changing means for moving the cursor from one display means to another display means in the plurality of displays means,
wherein the at least one window includes a plurality of windows, each window being divided into a plurality of fields each including at least one responsive object, and
wherein each display means includes one default field situated on one of the plurality of windows, and on which the cursor arrives after moving from said one display means to said another display means.

29. A dialog system for dialog between at least one operator of an aircraft and at least one system of said aircraft, comprising:
at least two interactive windows, each of said at least two interactive windows including at least one responsive object associated with one of a plurality of functions of said at least one system of said aircraft;
a first moving mechanism configured to move a cursor on said interactive windows in an actuatable manner so as to designate a responsive object;
a second moving mechanism configured to move said cursor on said interactive windows in a discrete manner, responsive object by responsive object, so as to designate a responsive object;
a confirming mechanism for confirming the designated responsive object; and
a third moving mechanism configured to move said cursor from window to window using an auxiliary displacement keys,
wherein said cursor is displayed at a default location in a window after moving said cursor from one window to another window.

30. The dialog system of claim 29, further comprising a fourth moving mechanism configured to move said cursor directly onto a responsive object associated with a function using a function key.

31. The dialog system of claim 30, wherein said confirming mechanism is configured to confirm the designated responsive object in an actuatable manner.

32. The dialog system of claim 30, wherein said confirming mechanism is configured to confirm the designated responsive object using at least one confirmation key.

33. The dialog system of claim 30, wherein the at least two interactive windows include eight displays, of which three displays are for a pilot of the aircraft, three other displays are for the copilot of the aircraft, and two displays are for common use by the pilot and copilot of the aircraft.

34. The dialog system of claim 29, wherein said confirming mechanism is configured to confirm the designated responsive object in an actuatable manner.

35. The dialog system of claim 29, wherein said confirming mechanism is configured to confirm the designated responsive object using at least one confirmation key.

36. The dialog system of claim 29, wherein the at least two interactive windows include eight displays, of which three displays are for a pilot of the aircraft, three other displays are for the copilot of the aircraft, and two displays are for common use by the pilot and copilot of the aircraft.

* * * * *